(12) United States Patent
Chiu

(10) Patent No.: US 10,348,843 B2
(45) Date of Patent: *Jul. 9, 2019

(54) MUST-REPLY MOBILE QUESTIONNAIRE SYSTEM AND METHOD

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 365 days.

This patent is subject to a terminal disclaimer.

(21) Appl. No.: 14/874,527

(22) Filed: Oct. 5, 2015

(65) Prior Publication Data

US 2016/0028843 A1 Jan. 28, 2016

Related U.S. Application Data

(62) Division of application No. 14/705,148, filed on May 6, 2015.

(30) Foreign Application Priority Data

| May 26, 2014 | (TW) | ............................. 103118226 A |
| Mar. 5, 2015 | (TW) | ............................. 104106976 A |

(51) Int. Cl.
| H04L 29/08 | (2006.01) |
| H04W 4/60 | (2018.01) |
| H04W 4/08 | (2009.01) |
| H04M 1/725 | (2006.01) |

(52) U.S. Cl.
CPC .............. *H04L 67/26* (2013.01); *H04L 67/10* (2013.01); *H04M 1/72577* (2013.01); *H04W 4/08* (2013.01); *H04W 4/60* (2018.02)

(58) Field of Classification Search
CPC .... H04L 67/26; H04L 67/10; H04M 1/72577; H04W 4/003; H04W 4/08
See application file for complete search history.

(56) References Cited

U.S. PATENT DOCUMENTS

| 8,949,351 B2* | 2/2015 | Ciancio-Bunch .... G06Q 10/107 709/206 |
| 2002/0104096 A1* | 8/2002 | Cramer .............. H04N 7/17318 725/113 |
| 2005/0060219 A1* | 3/2005 | Deitering ......... G06Q 10/06375 705/7.32 |
| 2012/0116840 A1* | 5/2012 | Omer ..................... G06Q 30/02 705/7.29 |
| 2013/0048710 A1* | 2/2013 | Marsico ............ G06F 17/30879 235/375 |

(Continued)

*Primary Examiner* — Viet D Vu
(74) *Attorney, Agent, or Firm* — Locke Lord LLP; Tim Tingkang Xia, Esq.

(57) ABSTRACT

The present invention provides a must-reply mobile questionnaire system and method. The system comprises a cloud composed of a database, a server, and a push gateway. The server generates a questionnaire issuing request and sends it as a push notification, via the push gateway and an external push server, to a specific mobile communication device. All executable functions on the mobile communication device are locked until a questionnaire involved in the questionnaire issuing request is replied.

12 Claims, 4 Drawing Sheets

(56) References Cited

U.S. PATENT DOCUMENTS

2013/0110660 A1* 5/2013 Yang ................ G06Q 30/02
705/26.1
2015/0234910 A1* 8/2015 Schiff ............... G06Q 10/20
707/634

* cited by examiner

MUST-REPLY MOBILE QUESTIONNAIRE SYSTEM AND METHOD

CROSS-REFERENCE TO RELATED APPLICATIONS

This application is a Divisional of U.S. application Ser. No. 14/705,148, filed on May 6, 2015, which claims priority under 35 U.S.C. § 119(a) on Patent Application No. 103118226, filed in Taiwan on May 26, 2014 and Patent Application No. 104106976, filed in Taiwan on Mar. 5, 2015, the contents of each are hereby expressly incorporated by reference into the present application.

BACKGROUND OF THE INVENTION

Field of the Invention

The present invention relates to cloud computing technology applied to mobile communication devices, and more particularly, to a must-reply mobile questionnaire system and method.

Description of the Prior Art

Nowadays, there are many systems available for message exchange within a group or corporation, wherein the systems employ cloud computing technology to provide message exchange services on mobile communication devices. One type of the messages delivered by such systems is a message which requires a user to select at least one answer and then reply, e.g., the user needs to cast a vote or complete a questionnaire survey. However, there are still many drawbacks with existing voting or questionnaire conducting technologies, and the needs of many groups or corporations cannot be satisfied.

Taiwanese Patent Publication No. 201337595 (hereinafter "Prior Art #1") describes an invention titled "Handheld Device, Electronic Questionnaire Processing Method and System Thereof," disclosing an electronic questionnaire processing method executed in a handheld device. The method comprises the following steps: (a) preparing an electronic questionnaire according to a predetermined time period and two alternative option data; (b) transmitting the electronic questionnaire to multiple members on the friends list according to the communication information; (c) collecting the response messages of the electronic questionnaire from different members; if the response messages occur within a predetermined time period, the number of the options selected in the response message is accumulated; if the predetermined time period is over, the number of the options selected is not accumulated; and (d) allowing the handheld device to display the options with the maximum cumulative number. The technical problem that Prior Art #1 actually aims to solve is that prior art electronic questionnaire surveys tend to have low response rates (see paragraph [0003]). Results yielded by Prior Art #1 are: "Questionnaire respondents can be quickly found out from the friends list. In addition, there is a time limit for completing the questionnaire, and there is only a small number of questions and options on the questionnaire. Thus, respondents will be more willing to complete the questionnaire. The response rate may increase, and the time/money can be saved to lower the total cost" (see paragraph [0017]).

Taiwanese Patent Publication No. 201036414 (hereinafter "Prior Art #2") describes an invention titled "Message Managing System, Message Managing Apparatus and Operating Method Thereof," disclosing a message managing system. The message managing system comprises a message managing apparatus and N electronic apparatuses. N is a positive integer. The message managing apparatus comprises a message generating module, a transmitting/receiving module, and a statistics module. The message generating module is used for generating a questionnaire message comprising a replying menu and a sequence command. The transmitting/receiving module transmits the questionnaire message and receives a default replying message. The statistics module generates a statistics result according to the default replying message. The technical problem that Prior Art #2 actually aims to solve is that "conventional methods for delivering questionnaire messages are not very convenient for either message senders or message receivers" (see paragraph [0005]). Results yielded by Prior Art #2 are: "To successfully conduct a questionnaire with a respondent and obtain a result of the selected options, a sender simply needs to send, with his/her mobile phone, a questionnaire message to the respondent's mobile phone. And the respondent simply needs to press some keys to easily reply to the questionnaire message" (see paragraph [0009]).

Prior Art #3 refers to a customized message delivery system developed by a software development company specifically for a particular corporation to suit the needs of that corporation. The system is located at the corporation's own IDC or a co-location site, and members (the staff of the corporation) use a dedicated application (app), which is also custom-made for the corporation, installed on a mobile communication device to access the server of the message delivery system. With respect to the deployment model, Prior Art #3 employs a private cloud deployment model. When there are N corporations employing the private cloud deployment models, there must be N corresponding app sets (one app set includes apps created for different major platforms of mobile communication devices) and N portals (since each private cloud has its own server IP address, the login portals for N corporations must be different). The technical problem that Prior Art #3 actually solves is that the private cloud deployment model allows a corporation to completely manage and control information security on its own, and that a dedicated app allows members of the corporation to avoid unnecessary disturbance from users outside the corporation. This means that a dedicated app is required to access the customized system. Only the members of the corporation have permission to use the app; family and friends of the members cannot send messages to them with other apps. Results yielded by Prior Art #3 are that the message delivery system employs a private cloud deployment model, and that a dedicated app is used. However, for software development companies, developing customized message delivery systems employing the private cloud deployment model and developing customized apps for particular groups or corporations constantly may consume quite much labor and time and can be very costly. Moreover, future upgrading of the software may be a more difficult task.

Prior Art #4 refers to a message exchange service that employs a public cloud deployment model and utilizes mobile communication devices and push technology to provide a person-to-person messaging service or messaging service within a single level of an organization. An example is the LINE app and its back-end system developed by LINE Corporation of Japan, a subsidiary of the Korea-based NHN Corporation. The biggest problem with Prior Art #4 is that there is not enough protection of privacy. For example, suppose that two members (member A and member B) of an organization know each other and both join such a messaging system. And suppose that for some reasons, member A does not want member B to know that member A is using the same app and system, lest member B adds member A to the friends list of member B. However, Prior Art #4 allows users to search for other users in the database by using a mobile phone number or email address to perform the search. That is, from the database of the system, member B can easily search member A out with member A's mobile phone number or email address. Moreover, Prior Art #4 requires that each member has a unique member account (i.e., user ID). If a member intends to join different organizations or use the service in different countries, he/she will need to create different, non-duplicate accounts. The technical problem that Prior Art #4 aims to solve is that conventional messaging services fail to provide messages with diverse types of content and thus fail to provide vivid, lively communication experience for users. Results yielded by Prior Art #4 are: providing a message delivery system employing a public cloud deployment model; providing a person-to-person messaging service or messaging service within a single level of an organization; and enhancing messaging services by providing more vivid, lively message stickers.

The prior art techniques described above all fail to include an organization management module to cope with issues such as the needs of groups or corporations to have a flexible, multi-level organizational structure, issuing questionnaires to specific levels, and using a single cloud system to provide services to many groups or corporations. For example, in a corporation consisting of multiple levels, when an employee from one segment of the corporation intends to conduct a questionnaire survey, prior art techniques do not allow the employee to issue a request to all the staff of that specific segment, or to issue the questionnaire to separate levels or segments within the corporation. And multiple corporations are not able to share the same questionnaire system. Moreover, those prior art techniques do not allow wireless clients to use a single app and a single portal to access the server in a hybrid cloud system. This is because each corporation has a dedicated app specifically developed for the questionnaire system of that corporation, and different corporations have different portals for accessing the questionnaire systems. Also, those prior art techniques cannot force wireless clients to respond to the electronic questionnaires; the technical means and results involved in prior art techniques have nothing to do with "must-reply mobile questionnaires." As such, to overcome problems in prior art techniques, there exists a need to provide a cloud system for conducting mobile questionnaires, wherein the system suits the needs of different groups or corporations and supports multi-level organizational structures. With the system, wireless clients can use a single app to log in to a single portal (i.e., a connecting interface) in the public cloud; push notifications for the questionnaire issuing request can be sent from the public cloud; and groups or corporations can receive questionnaire results with their own private clouds to control the questionnaire survey process.

SUMMARY OF THE INVENTION

In view of the above, the present invention provides a must-reply mobile questionnaire system and method that allows organization members to use a single app to connect to a single portal, so as to further access a cloud mobile questionnaire system managed by multiple organizations or organizational structures.

The present invention provides a must-reply mobile questionnaire system, comprising: a database, a server, and a push gateway at a server end, and a mobile communication device at a user end, wherein the database, the server, and the push gateway compose a cloud. The database stores a plurality of questionnaires, a selected option corresponding to the questionnaires, and a plurality of member information sets. Each questionnaire comprises an attribute and at least two options. Each member information set comprises at least one organization ID, an account, and a password. Each of the organization IDs is unique, non-duplicate, and corresponds to a single organization; the organization is either a single-level organization or a multi-level organization. The server accesses the database and comprises: a first network communication module for establishing an Internet connection to at least one mobile communication device having one of the member information sets; a login authentication module, which receives the organization ID, the account, and the password that have been uploaded to perform authentication; a questionnaire generating module, which generates a questionnaire issuing request based on the questionnaire and a questionnaire recipient push list, the questionnaire recipient push list comprising at least one push ID corresponding to one of the member information sets; and a questionnaire collecting and statistics generating module, which receives, via the Internet connection, the selected option that has been responded from the mobile communication device, stores the responded selected option to the database, generates statistics based on the responded selected option, and then generates a questionnaire statistics report. The push gateway generates a push notification based on the questionnaire issuing request and sends the push notification to the mobile communication device via an external push server. The push notification comprises a push notification serial number for the mobile communication device to download the full content of the questionnaire from the server.

The mobile communication device executes an application (app), the application comprising: a second network communication module for establishing an Internet connection to the first network communication module of the server; a login module, which receives the organization ID, account, and password that have been entered and uploads them to the server via the second network communication module; a data access module, which, after the push notification is received, triggers the second network communication module to establish the Internet connection to the first network communication module of the server and downloads, from the server, the full content of the questionnaire corresponding to the push notification serial number, wherein the questionnaire comprises an attribute and at least two options; a function lock module, which checks the attribute of the questionnaire and if the questionnaire is a must-reply one, locks all the executable functions of the application enabled with the organization ID until the application responds to the questionnaire; and a questionnaire response module for receiving a selection command for the option and uploading the responded selected option via the second network communication module after receiving a response command. In the system described above, the first network communication module, the login authentication module, the questionnaire generating module, and the questionnaire collecting and statistics generating module belong to a server module group. And the server module group has a modular and distributed design, such that the server module group can be divided to have the modules distributed over separate IDC (Internet Data Center). In addition, the application may further comprise a questionnaire input module for inputting the questionnaire and the attribute and at least two options of the questionnaire, for specifying at least one questionnaire recipient, and for uploading the questionnaire recipient to the server via the second network communication module.

The present invention provides a must-reply mobile questionnaire method applied to a cloud composed of a database, a server, and a push gateway. The must-reply mobile questionnaire method comprises: storing to the database a plurality of questionnaires, a selected option corresponding to the questionnaires, and a plurality of member information sets, each member information set comprising at least one organization ID and at least two options, each member information set comprising at least one organization ID, an account, and a password, each organization ID being unique, non-duplicate, and corresponding to an organization, the organization being a single-level organization or a multi-level organization; establishing an Internet connection between the server and at least one mobile communication device having one of the member information sets; receiving, by the server via the Internet connection, the organization ID uploaded from the mobile communication device, wherein the organization ID is for authentication; generating, by the server, a questionnaire issuing request based on the questionnaire and a questionnaire recipient push list, the questionnaire recipient push list comprising at least one push ID corresponding to one of the member information sets; generating, by the push gateway, a push notification based on the questionnaire issuing request, and sending, via a push server, the push notification to the mobile communication device; and receiving, by the server via the Internet connection, the selected option responded and uploaded from the mobile communication device, storing the responded selected option to the database, generating statistics and then generating a questionnaire statistics report.

The present invention provides a must-reply mobile questionnaire method applied to a mobile communication device that accesses a cloud composed of a database, a server, and a push gateway, the database storing a plurality of member information sets, each member information set comprising at least one organization ID, the mobile communication device executing an application (app) to perform the method. The must-reply mobile questionnaire method comprises: establishing an Internet connection between the server and the mobile communication device having one of the member information sets; receiving the organization ID, an account, and a password that have been entered so as to perform login authentication, and uploading them to the server via the Internet connection; after receiving a push notification, locking all the executable functions enabled with the organization ID until the mobile communication device receives a response command to generate a responded selected option, wherein the push notification comprises a push notification serial number; receiving a command corresponding to a server module group, performing a redirection based on server module location information, and downloading the full content of the questionnaire corresponding to the push notification serial number; and receiving the response command to generate the responded selected option, and uploading the responded selected option to the server via the Internet connection. In this method, the questionnaire comprises an attribute and at least two options, wherein the attribute is selected from: compulsory, non-compulsory, named, anonymous, single answer, and multiple answers. And if after checking, the attribute of the questionnaire is compulsory, all the executable functions enabled with the organization ID will be locked. In this method, if the deployment of the cloud is a hybrid cloud model, then the organization ID will be uploaded to a public cloud and the responded selected option uploaded to a private cloud.

The features and advantages of the present invention will be fully described by way of preferred embodiments, which are sufficient for those skilled in the art to understand and carry out the invention. Those skilled in the art can easily understand the objects and advantages of the present invention based on the description, claims, and drawings disclosed in this specification.

DETAILED DESCRIPTION OF THE PREFERRED EMBODIMENTS

Figure 1:
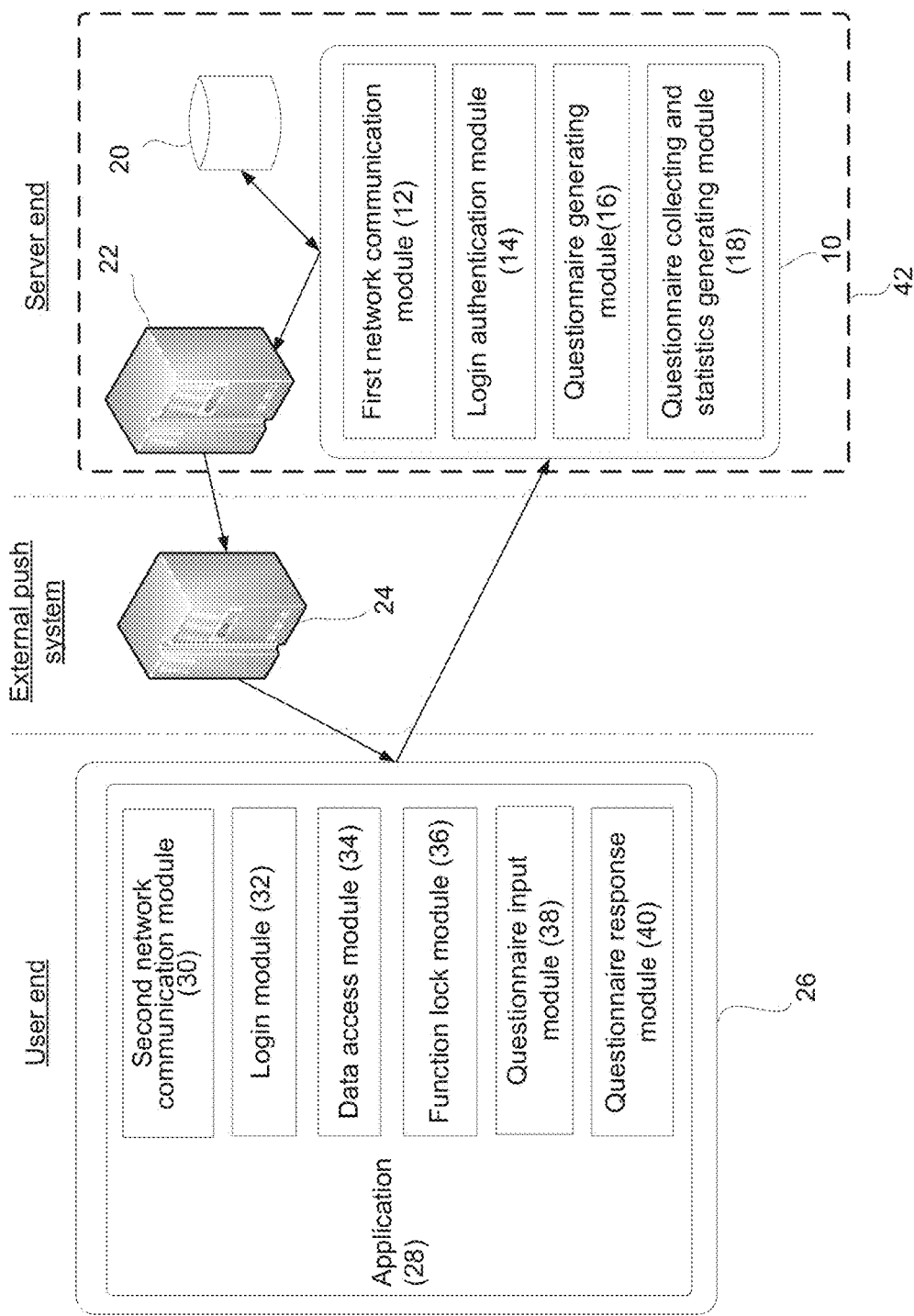
FIG. 1 is a system architecture diagram according to an embodiment of the present invention.

FIG. 1 is a system architecture diagram according to an embodiment of the present invention. The system according to the present invention comprises: a server end (i.e., cloud 42) including a database 20, a server 10, and a push gateway 22, and a user end including a mobile communication device 26. The database 20 stores a plurality of questionnaires, a selected option corresponding to the questionnaires, and a plurality of member information sets. Each member information set comprises at least one organization ID, an account, and a password. Each questionnaire contains an attribute and at least two options. An "organization" used herein refers to an association, group or business. Each organization is identified by a unique organization ID. That is, any new organization will be assigned a non-duplicate ID by the system of the present invention. An organization ID corresponds to only one organization and is stored in a "table" of that organization. In an embodiment of the present invention, the system uses a hierarchical namespace data structure to define the organizations (i.e., to assign organization IDs). Once an organization is assigned an organization ID, the organization becomes completely independent of other external organizations or users (i.e., users external to the organization cannot search for information inside the organization). Even the name of the organization cannot be searched out by external people, who simply cannot know if certain organization is existence in the system; therefore, the organization can have sufficient privacy. An organization ID is used as the root namespace. An organization may be composed of a single level or multiple levels, and includes at least one member. The "levels" used herein refer to the structure within an organization. For example, a single-level organization may be a table tennis club or a family; as there are only a few members in the organization, there is no need to divide them into different levels. By contrast, a multiple-level organization may be, for example, a corporation. The corporation may include four hierarchical levels, such as business units, departments, divisions and teams, based on the functional segments, or may include fifteen hierarchical levels, such as Job Grade 1, Job Grade 2 . . . Job Grade 15, based on the members' job grades. In an embodiment of the present invention, a member may join two or more organizations at the same time, and thus may have several organization IDs corresponding to the organizations that the member belongs to. For example, if a member joins three organizations—a sports club, a charity group, and a corporation—at the same time, the member will have three different organization IDs corresponding to the respective organizations that the member belongs to. Each of the member information sets stored in the database 20 includes the organization ID corresponding to the organization that the member belongs to, and the account and password for logging on to the cloud 42 based on that organization ID.

The server 10 comprises the following server modules (or server module groups): a first network communication module 12, a login authentication module 14, a questionnaire generating module 16, and a questionnaire collecting and statistics generating module 18. The first network communication module 12 is used for establishing an Internet connection to a second network communication module 30 in the mobile communication device 26 at the user end. In various embodiments of the present invention, the Internet connections are established based on TCP protocols (including socket and WebSocket connections), HTTP protocols, or HTTPS protocols. The login authentication module 14 receives an organization ID, account and password uploaded by a member of certain organization via the mobile communication device 26, and conducts the authentication using the member information set—including the organization ID, account and password of that member—stored in the database 20. The questionnaire generating module 16 receives the questionnaire sent from the mobile communication device 26 and writes to the database 20; the questionnaire generating module 16 also generates a questionnaire issuing request based on the questionnaire and a questionnaire recipient push list. The questionnaire recipient push list includes at least one push ID corresponding to one of the member information sets. A push ID corresponds to a members receiving device (i.e., the mobile communication device 26). Setting the recipient name list of the questionnaire receiving end is often done by clicking on member names on an organization contact list. The questionnaire generating module 16 then needs to conduct a mapping to transform the recipient name list (i.e., a list including selected members on the organization contact list) of the questionnaire receiving end into a questionnaire recipient push list (i.e., a list including "push IDs" of the selected members). The questionnaire collecting and statistics generating module 18 generates statistics based on the selected options answered by the members and generates a questionnaire statistics report.

The number of devices where the server 10 and the database 20 are deployed is not limited. In various embodiments of the present invention, the server 10 and the server 20 may be deployed on the same device, or may be deployed on separate devices of the same cluster, or may be deployed on separate devices of different clusters.

The push gateway 22 generates a push notification based on the questionnaire issuing request and sends the push notification through an external push server 24 (e.g., MPNS, GCM and APNS). In an embodiment of the present invention, the questionnaire issuing request comprises partial or full content of the questionnaire and the push ID on the questionnaire recipient push list. The push notification comprises a non-duplicate push notification serial number (at least non-duplicate for a period during which recent data may be searched). In an embodiment of the present invention, whether a push notification comprises "partial or full content" of the questionnaire depends on the size of the questionnaire. For example, the APNS has a payload limit of 256 bytes. And when the content of a questionnaire does not exceed 256 bytes, the full content of the questionnaire is included in the notification. When the content of a questionnaire exceeds 256 bytes, only partial content (the initial part that does not exceed the 256-byte size limit) of the questionnaire is included in the push notification.

In various embodiments of the present invention, the mobile communication device 26 may be a smartphone or tablet computer that runs a mobile operating system such as iOS, Android, or Windows Phone, and executes an app (application) 28. The app 28 comprises: a second network communication module 30, a login module 32, a data access module 34, a function lock module 36, and a questionnaire response module 40. The second network communication module 30 is used for establishing an Internet connection to the first network communication module 12 in the server 10. In various embodiments of the present invention, the Internet connections are established based on TCP protocols, HTTP protocols, or HTTPS protocols. The login module 32 receives an organization ID, account, and password entered by a user (i.e., member) via an input interface on the mobile communication device 26, and sends them to the server 10 for authentication. When the data access module 34 receives a push notification, the second network communication module 30 is activated to establish an Internet connection (based on TCP, HTTP, or HTTPS protocols) to the first network communication module 12 in the server 10. The data access module 34 then downloads the full content of the questionnaire corresponding to the push notification serial number from server 10. The questionnaire contains an attribute and at least two options, and the attribute is selected from the following: compulsory, non-compulsory, named, anonymous, single answer, and multiple answers. In an embodiment of present invention, an Internet connection is established between the second network communication module 30 and the first network communication module 12 using the TCP protocol or WebSocket protocol (a type of TCP protocol whereby the client sends a handshake request in HTTP form), and in this embodiment, the data access module 34 directly downloads the questionnaire. In another embodiment of the present invention, an Internet connection is established between the second network communication module 30 and the first network communication module 12 using the HTTP protocol or HTTPS protocol, and in this embodiment, the data access module 34 downloads the questionnaire using the polling technique. After the mobile communication device 26 receives the push notification and downloads the questionnaire corresponding to the push notification serial number, the function lock module 36 checks the attribute of the questionnaire. If the attribute is set to "compulsory," then the function lock module 36 will lock all the other executable functions of the app 28 enabled the organization ID (that is, the organization ID, used as the login ID, received the questionnaire), until the app 28 responds to the questionnaire. That is, if a member receives a questionnaire whose attribute is set to "compulsory," the app 28 according to the present invention will use compulsory technical means to block the member from using other executable functions (e.g., chats, sticker/emoticon/picture/emoji posting, bulletin boards, voice calls/voice messages, file transfer, etc.). The member cannot use the other executable functions until responding to the questionnaire, which is one of the major features of the present invention. The questionnaire response module 40 is used for receiving the selection commands (i.e., the user clicks on "check boxes"

or a "radio button") for the options and uploading the selected options in the questionnaire after receiving the response commands (i.e., the user clicks on the "respond" button).

In an alternate embodiment of the present invention, the app 28 run by the mobile communication device 26 further comprises a questionnaire input module 38. When a member having permission to input a questionnaire uses the mobile communication device 26 and logs in with the members organization ID, the app 28 will enable the questionnaire input module 38 to upload a new questionnaire and relevant settings. The questionnaire input module 38 receives the members command to input a new questionnaire, which at least including two or more options, and sets the attributes of the questionnaire and at least one questionnaire recipient name list. Attributes may include, for example, compulsory/non-compulsory (for determining whether to compel the recipient to respond at high priority), named/anonymous (suitable for having a vote), single answer/multiple answers (whether to select a single option or multiple options), etc. Setting the questionnaire recipient name list is done by selecting, from an organization contact list, specific members, specific level(s) of the organization, specific group list(s), or all members of the organization. An "organization contact list" is edited by members who have administrator permission (e.g., management information system (MIS) engineer) to edit; other members can only check but cannot edit the organization contact list. A "specific group list" is also edited by members who have administrator permission; for example, these members may be "Job Grade 1 supervisors from all segments/levels within the organization," "Job Grade 2 supervisors from all segments/levels within the organization," or "base-level staff from all segments/levels within the organization," etc. As these members on the recipient name list are distributed at different segments/levels, it is necessary to edit a specific group list to facilitate the use.

As described above, the function lock module 36 according to the present invention can lock all the other executable functions enabled with the organization ID; this means that except for the questionnaire response function and other relevant, necessary processes thereof, all the executable functions of the app 28, with the organization ID used as the login ID that received the questionnaire, will be temporarily locked and become non-executable. In an embodiment of the present invention, if a member joins several different organizations and one of the organizations sends a questionnaire push notification from the cloud, only the executable functions of the app 28 enabled with the organization ID (that is, the ID of organization, which sent the questionnaire) will be locked and become non-executable. If the member uses other organization IDs to log in to the app, then none of the executable functions of the app 28 would be affected. In an exemplary embodiment, for example, a member joins three organizations—a sports club, a charity group, and a corporation—at the same time. The corporation has sent a questionnaire to all the employees, but the member has not responded to the questionnaire yet. Then, if the member logs in to the app 28 with the organization ID of that corporation, all the executable functions of the app 28 are not executable except the questionnaire response function. But if the member logs in to the app with the organization ID of the sports club or of the charity group, then none of the executable functions of the app 28 would be affected.

In an embodiment of the present invention, the app 28 uses at least two layers of views to display the different GUIs respectively. The questionnaire response function alone (i.e., the GUI associated with the questionnaire response module 40) uses one of the view layers, and the view for the questionnaire response function is set to be "always-on-top." When other executable functions are locked, the underneath layers are non-executable. For example, the questionnaire response function may be displayed using a pop-up window; the uppermost view layer displaying the questionnaire response function can be closed and other view layers become executable only after the questionnaire has been responded. In another embodiment of the present invention, values representing execution priorities are set for all the functions/processes in the app 28, and functions/processes associated with questionnaire response are set to have the highest priority. When the function lock module 36 performs locking operations, the app 28 only permits functions/processes with high-priority values (e.g., the questionnaire response function and other relevant, necessary processes) to be executed. Other functions/processes with low-priority values can be executed only after the questionnaire has been responded. In yet another embodiment of the present invention, an executing flag is set for each function/process in the app 28. When the function lock module 36 performs locking operations, the executing flags of the questionnaire response function and other relevant, necessary processes are set to "Enable," while the executing flags of other executable functions are set to "Disable." And after the function lock module 36 performs an unlocking operation, the executing flags of all the executable functions/processes will be reset to "Enable." The app 28 checks the executing flag before executing a function/process, and only the functions/processes with the "Enable" flags will be executed.

In an embodiment of the present invention, as described above, a member may join several different organizations at the same time, and own several organization IDs of the organizations that the member belongs to. If a member joins three different organizations, and the member's three accounts have all been verified (a step in the account registration process, where, for example, an email address or mobile phone number is used for verification), the member can use the same app 28 to receive push notifications sent from all of the three organizations after logging in to the app. If the member does not want to receive push notifications sent from one of the organizations, the member can turn off push notifications from that organization in the organization's "settings," or simply log out of that organization.

Figure 2:
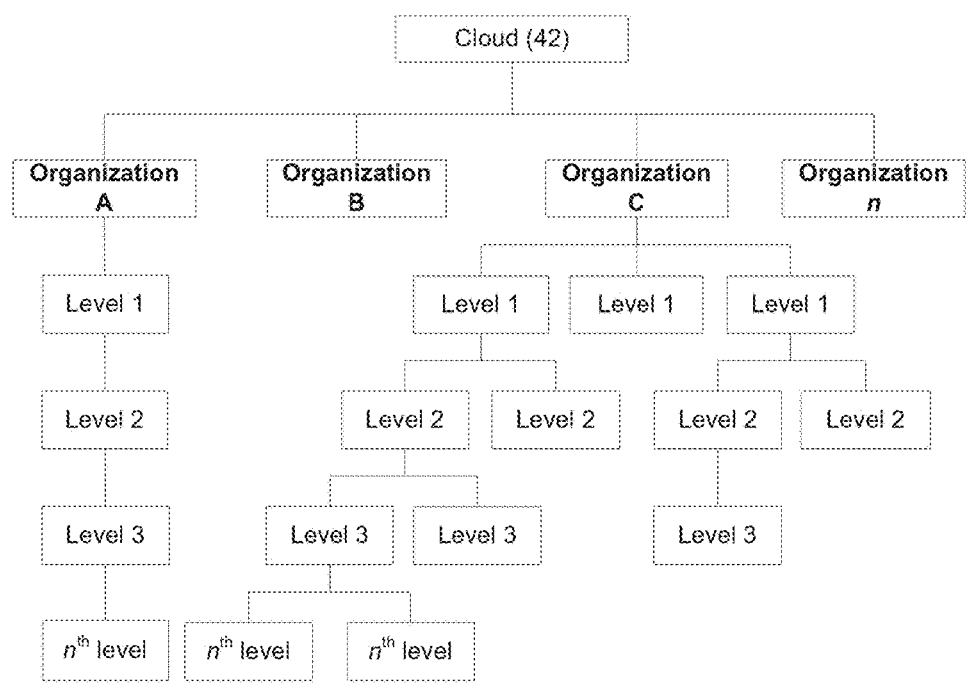
FIG. 2 is a schematic diagram showing the organizations and levels in the cloud according to an embodiment of the present invention.

FIG. 2 is a schematic diagram showing the organizations and levels in a cloud 42 according to a preferred embodiment of the present invention. The cloud 42 according to the present invention can support a plurality of organizations. Each organization consists of one level or a plurality of levels, each level composed of zero to multiple members (not shown). The "Organization A" shown in FIG. 2 has a vertical-type (or tower-type) multi-level structure; this structure is suitable for an organization where members are classified into different levels with the grades of positions. For example, Level 1 refers to Job Grade 15, Level 2 refers to Job Grade 14, Level 3 refers to Job Grade 13, and so on, wherein Job Grade 13 or above are top-level managers. The questionnaire input module 38 according to the present invention allows members who have permission to designate the levels for sending the questionnaire when creating a new questionnaire; for example, the questionnaire can be sent to top-level managers in the organization, which includes Level 1 to Level 3 members. The "Organization B" shown in FIG. 2 has a structure consisting of only one level. This organizational structure is suitable for an organization with relatively few members or having a flat structure, such as a family, student-run club, small-sized company, or small-sized group composed of members sharing the same interest, etc. The "Organization C" shown in FIG. 2 has a pyramid-type multi-level structure and is suitable for large- or medium-sized corporations or groups. One of the major features of the present invention is that an organizational structure consisting of multiple levels can be flexibly set as described above.

In an organization consisting of a plurality of levels (e.g., the "Organization A" and "Organization C" described above), there is generally an administrator in each level who has permission to configure settings. In an organization which is a corporation, the top administrator is generally an MIS engineer of the corporation, and the administrator of each level is generally the supervisor of a functional segment (e.g., the supervisor of a business unit, of a department, of a division, or of a team). The administrator permission is generally granted to a member when a new organization and its administrator's account are being created; or, the administrator permission may be further granted to the member after the administrators account has been created. In an embodiment of the present invention, the system uses a namespace data structure. The data within each organization is completely independent of other external organizations or users. Even if the accounts (i.e., the member's accounts) under different organizations use the same numbering method (e.g., employee number 0001, 0002, 0003, and so on), there are no conflicting accounts. Thus, each organization can have more flexibility in setting the numbering of accounts. There is no need to worry if the same account has been used by a member from another organization. In addition, to avoid unnecessary disturbance from users outside the organization, even if different organizations use the same mobile phone number or email address of a member to set the members account (or use them in the contact information), a member cannot search for the mobile phone number or email address of another member who is not in the same organization. In contrast, a member can search for another members information, using a mobile phone number, email address or keyword, if that member is within the same organization. Performing searches within an organization is a known technique and will not be described in details here. One of the major features of the present invention is that organization IDs and a namespace data structure are used to identify different organizations, so that users outside a certain organization cannot search for members within that organization.

Figure 3:
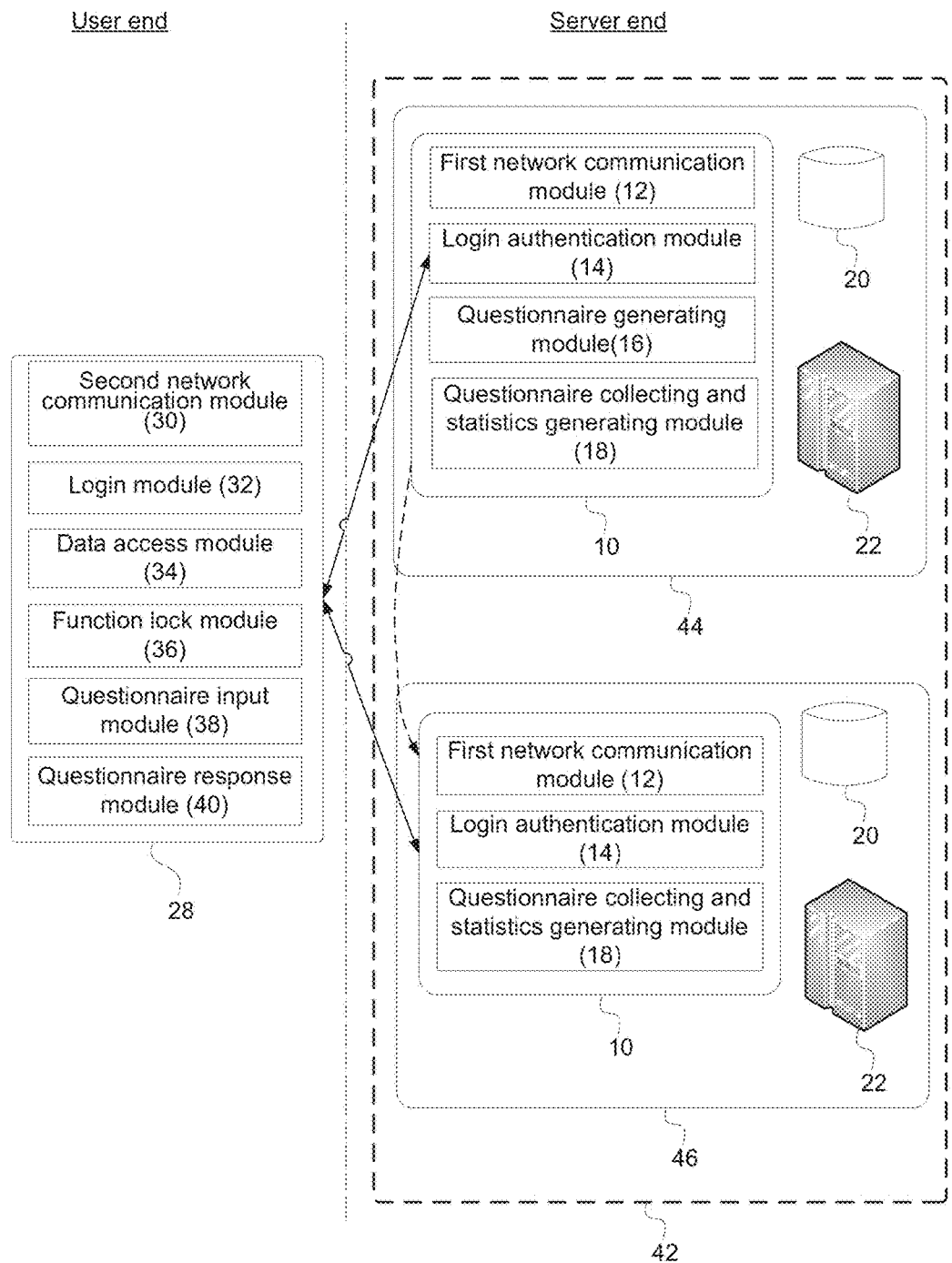
FIG. 3 is a schematic diagram showing a cloud deployment model according to an embodiment of the present invention.

FIG. 3 is a schematic view showing the deployment models in a cloud 42 according to a preferred embodiment of the present invention. Two deployment models may be provided in the cloud 42: a public cloud model and a hybrid cloud model. In the public cloud model, the server 10, the database 20, and the push gateway 22 at the server end are all provided by a service provider. If, for example, Organization A is an ordinary company or group which does not have specific, strict requirements for management and control of information security, then the server module group (including the first network communication module 12, the login authentication module 14, the questionnaire generating module 16, the questionnaire collecting and statistics generating module 18, etc.) and devices which the members of the organization need to access may be located in a public cloud 44. This means that the records relating to questionnaire sending and responses are kept in the database 20 in the public cloud 44; the service provider is responsible for keeping those records. In the hybrid cloud model, some of the server modules and devices are located in the public cloud 44, while the others are located in a private cloud 46. The locations of all the server modules are stored in "server module location information," which records information about the server module group in the private cloud 46 and the relevant IP addresses. If, for example, Organization C is a financial services company which has strict requirements for management and control of information security, then Organization C will have to place all the server modules relating to the processing of personal information and keep all transmission records in its own IDC (or in leased virtual servers, leased IDC, etc.). As a result, except that the login authentication module 14 (i.e., the login portal) is located in the public cloud 44, all the other devices and server modules are located in the private cloud 46 (i.e., Organization C's own IDC) and their locations are recorded in the server module location information. When a member of Organization C uses the app 28 of the present invention to access the cloud 42, the member first logs in to the portal in the public cloud 44 (the login authentication module 14). After login authentication is completed and the app 28 on the mobile communication device receives commands corresponding to the server module group, the system will perform a redirection based on the server module location information. For example, if the user selects a questionnaire-related function (by executing the questionnaire input module 38 or the questionnaire response module 40), which corresponds to the questionnaire generating module 16 or the questionnaire collecting and statistics generating module 18, the system will perform a redirection based on the IP address of the questionnaire generating module 16 or the questionnaire collecting and statistics generating module 18 in the private cloud 46, wherein the IP addresses are recorded in the server module location information. Then, the app 28 can directly access the questionnaire generating module 16 or the questionnaire collecting and statistics generating module 18, both of which located in the server in the private cloud 46. Therefore, Organization C's sensitive data (e.g., questionnaire sending records) can be entirely kept in the database 20 in the private cloud 46.

In an embodiment of the present invention, the server module group may have a modular and distributed design. That is, the server module group may be divided to have its modules located at separate IDC (e.g., some in the server in the public cloud 44 and the others in the server in the private cloud 46) depending on the needs of corporations; this is also one of the major features of the present invention. When a server module group is divided to have its modules located separately in the public cloud 44 and the private cloud 46, and meanwhile, the login authentication module 14 is located in the public cloud 44 and redirection is performed using the server module location information, such deployment model constitutes the hybrid cloud model according to the present invention.

Although the hybrid cloud deployment model described above also involves some customized services (e.g., dividing the server modules and arranging them separately) depending on the needs of corporations, it is still distinct from the technique disclosed in Prior Art #3. In the present invention, there is no need to use a dedicated application, which is common in prior art techniques, at the user end to access the private cloud 46. In the hybrid cloud model according to the present invention, the same app 28 is used to access the private cloud 46 of the system, and as described above, this is because the login portal is still located in the public cloud 44 (where the login authentication module 14 is located). In other words, service providers do not need to design customized and dedicated apps for different corporations. Service providers can use a single app 28 to serve all corporations, and this will save much time, work, and manpower required for an app to become available for sale (for example, any app needs to go through a strict review and approval process, which may be time-consuming, before the app becomes ready for sale in Apple's App Store). Using a single portal and a single application (app) to access the public cloud in the hybrid cloud model is one of the major features of the present invention.

In another embodiment of the present invention, a step of verifying a digital certificate (or electronic certificate) is required before a redirection to the private cloud 46 is performed. With this step, the identity of the private cloud 46 is verified so that theft of data by any fake server can be avoided. In this embodiment, when an administrator of the private cloud 46 is configuring the settings for the private cloud 46 (i.e., registering the private cloud 46 with the public cloud 44), the administrator needs to enter the storage path for a digital certificate (the digital certificate is stored in the private cloud 46) issued by a certificate authority. Then, the authenticity and validity of the digital certificate need to be verified by a certificate verification center (As the techniques of applying for a digital certificate with a certificate authority and using the API of a certificate verification center to verify the authenticity and validity of a digital certificate are known techniques, details are omitted here for brevity). Only after the authenticity and validity of the digital certificate have been verified, can the IP address of the private cloud 46 and its digital certificate be recorded to the server module location information. Before a redirection to the private cloud 46 is performed, when a user has logged in to the system and completed the step of login authentication, the login authentication module 14 in the public cloud 44 conducts a verification based on the IP address and the digital certificate information recorded to the server module location information. Alternatively, token technology may be utilized in this embodiment. The verification step may be replaced by a token within the valid period (e.g., within 24 hours after the token has been initially verified) of the token.

Figure 4:
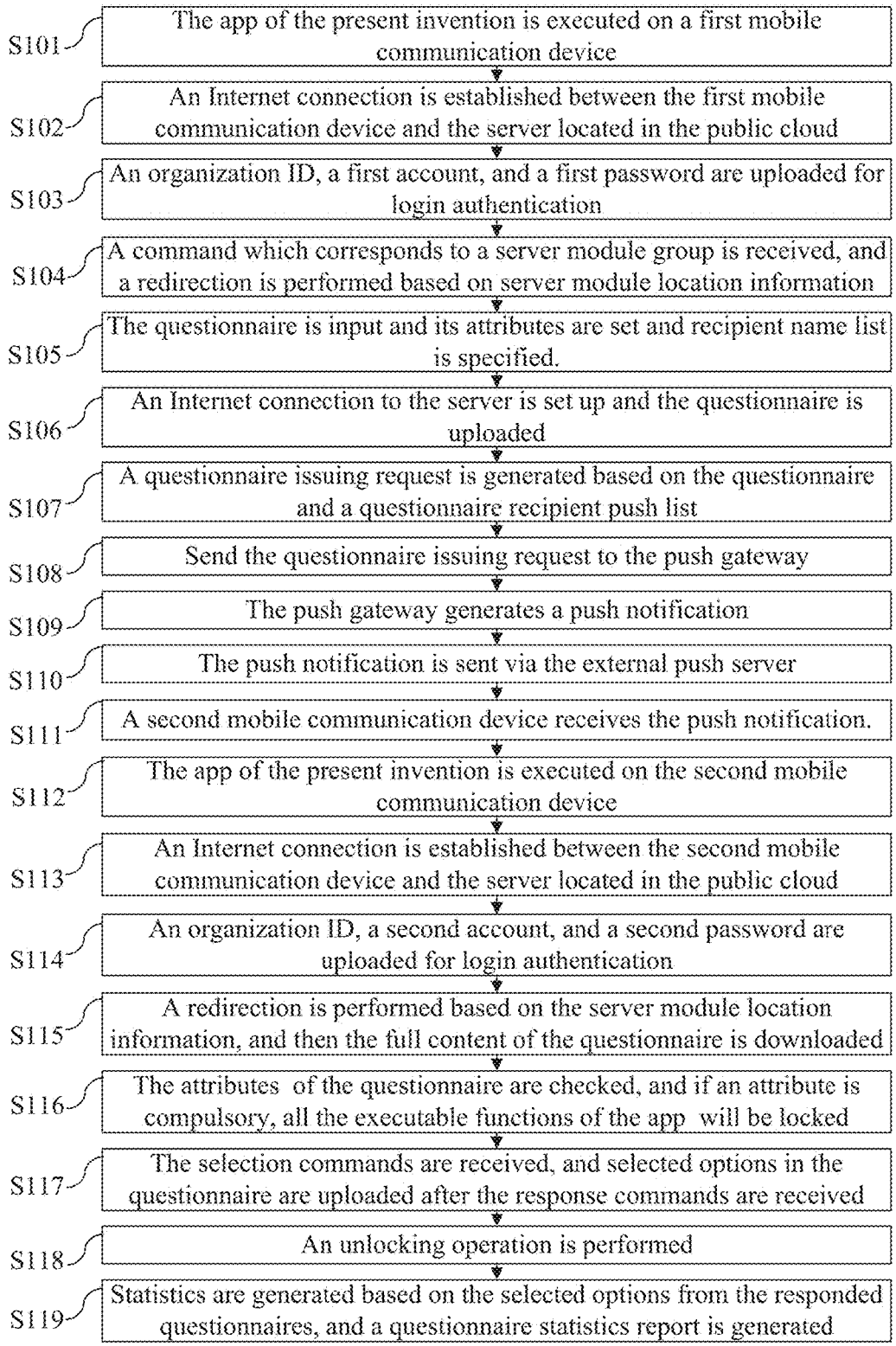
FIG. 4 is an operation process chart according to an embodiment of the present invention.

FIG. 4 is an operation process chart according to an embodiment of the present invention. This exemplary embodiment is used to explain a process in which a member having permission uploads a questionnaire to the server 10 from a first mobile communication device 26a, and then a second mobile communication device 26b receives and responds to the questionnaire. Please also refer to FIGS. 1, 2, and 3. The method according to the present invention includes:

Step S101: The app 28 of the present invention is executed on a first mobile communication device 26a. A first mobile communication device 26a is the equivalent of the mobile communication device 26 as described above, and may be, for example, an Apple iPhone 5S smartphone. Suppose that the user of the first mobile communication device 26a is a first member of Organization A.

Step S102: An Internet connection is established between the first mobile communication device 26a and the server 10 located in the public cloud 44. After the app 28 is executed, an Internet connection is established between the second network communication module 30 of the app 28 and the first network communication module 12 within the server 10 located in the public cloud 44. The Internet connection is established based on TCP protocols (including socket and WebSocket connections), HTTP protocols, or HTTPS (HTTP over SSL) protocols.

Step S103: An organization ID, a first account, and a first password are uploaded for login authentication. The first member having permission uses the app 28 on the first mobile communication device 26a to enter an organization ID, a first account, and a first password. The organization ID identifies that the first member belongs to Organization A. The first mobile communication device 26a then sends the organization ID, the first account, and the first password entered by the first member to the server 10 in the public cloud 44; the login authentication module 14 in the public cloud 44 authenticates login details.

Step S104: A command which corresponds to a server module group is received, and a redirection is performed based on server module location information. When the app 28 on the first mobile communication device 26a receives a command which corresponds to a server module group, the system then performs a redirection for the app 28 on the first mobile communication device 26a based on the server module location information stored in the public cloud 44. For example, if the first member selects the "Create a New Questionnaire" function (this selection command corresponds to the questionnaire generating module 16) in the app 28, the system then redirects the app 28 based on the server module location information, which records the "IP address of the questionnaire generating module 16 in the private cloud 46." Thereafter, the app 28 will directly access the questionnaire generating module 16 within the server 10 located in the private cloud 46.

Step S105: The questionnaire is input and its attributes are set, and then, at least one questionnaire recipient name list is specified. The first member uses the questionnaire input module of the app 28 on the first mobile communication device 26a to input the questionnaire and set its attributes (compulsory/non-compulsory, named/anonymous, single answer/multiple answers), and then specify at least one questionnaire recipient name list. The questionnaire recipient name list is set by selecting, from the organization contact list, specific members, specific level(s) of the organization, specific group list(s), or all members of the organization. Here, suppose that the questionnaire recipient name list includes a second member, whom the first member selects from the organization contact list, and suppose that an attribute of the questionnaire is "compulsory."

Step S106: An Internet connection to the server 10 is set up and the questionnaire is uploaded. If the Internet connection established between the second network communication module 30 and the first network communication module 12 in step S102 is based on a TCP protocol, then in step S106, the questionnaire can be directly uploaded to the questionnaire generating module 16. If the Internet connection established in step S102 is based on an HTTP protocol or HTTPS protocol, then in step S106, the HTTP or HTTPS protocol based Internet connection between the second network communication module 30 and the first network communication module 12 needs to be re-established. Thereafter, the questionnaire is uploaded to the questionnaire generating module 16.

Step S107: A questionnaire issuing request is generated based on the questionnaire and a questionnaire recipient push list. The questionnaire generating module 16 within the server 10 conducts a mapping based on the questionnaire recipient name list to generate a questionnaire recipient push list. The questionnaire recipient push list is composed of push IDs of the members and at least includes a push ID. Then, the questionnaire generating module 16 generates a questionnaire issuing request based on the questionnaire and the questionnaire recipient push list.

Step S108: The server 10 sends the questionnaire issuing request to the push gateway 22. Whether the questionnaire issuing request comprises "partial" or "full" content of the questionnaire depends on the size of the questionnaire content. If the questionnaire content exceeds the payload limit for push notifications, only partial content of the questionnaire will be included in the push notification.

Step S109: The push gateway 22 generates a push notification. The push gateway 22 generates a push notification based on the questionnaire issuing request.

Step S110: The push notification is sent via the external push server 24. The push notification includes a non-duplicate push notification serial number. The external push server 24 may be, for example, an MPNS, GCM, or APNS server.

Step S111: A second mobile communication device 26*b* receives the push notification. A second mobile communication device 26*b* is the equivalent of the mobile communication device 26 as described above, and may be, for example, an HTC One X smartphone. Suppose that the user of the second mobile communication device 26*b* is the second member of Organization A.

Step S112: The app 28 of the present invention is executed on the second mobile communication device 26*b*.

Step S113: An Internet connection is established between the second mobile communication device 26*b* and the server 10 located in the public cloud 44. After the app 28 is executed on the second mobile communication device 26*b*, an Internet connection is established between the second network communication module 30 of the app 28 and the first network communication module 12 within the server 10 located in the public cloud 44. The Internet connection is established based on TCP, HTTP or HTTPS protocols.

Step S114: An organization ID, a second account, and a second password are uploaded for login authentication. The second member having permission uses the app 28 on the second mobile communication device 26*b* to enter an organization ID, a second account, and a second password. The organization ID identifies that the second member belongs to Organization A. The second mobile communication device 26*b* then sends the organization ID, the second account, and the second password to the server 10 in the public cloud 44; the login authentication module 14 in the public cloud 44 authenticates login details.

Step S115: A redirection is performed based on the server module location information, and then the full content of the questionnaire is downloaded. The system redirects the app 28 on the second mobile communication device 26*b* based on the server module location information stored in the public cloud 44, in order to download the full content of the questionnaire corresponding to the push notification serial number. Here, suppose the questionnaire generating module 16 (i.e., one of the server modules) is located within the server 10 located in the private cloud 46 (relevant information is recorded in the server module location information). Thus, after the redirection, the second mobile communication device 26*b* has an Internet connection to the server 10 in the private cloud 46. If the Internet connection established between the second network communication module 30 and the first network communication module 12 in step S113 is based on a TCP protocol, then in step S115, the full content of the questionnaire corresponding to the push notification serial number can be directly downloaded by the data access module 34. If the Internet connection established in step S113 is based on an HTTP protocol or HTTPS protocol, then in step S115, the HTTP or HTTPS protocol based Internet connection between the second network communication module 30 and the first network communication module 12 needs to be re-established. Thereafter, the full content of the questionnaire corresponding to the push notification serial number can be directly downloaded by the data access module 34.

Step S116: The attributes of the questionnaire are checked, and if an attribute indicates that the questionnaire is compulsory, all the executable functions of the app 28 enabled with the organization ID, will be locked until the app 28 responds to the questionnaire. After the app 28 downloads the full content of the questionnaire corresponding to the push notification serial number, the function lock module 36 then checks if the attribute of the questionnaire is set to "compulsory." If the attribute is set to "compulsory," then the function lock module 36 will lock all the other executable functions of the app 28 enabled with the organization ID (e.g., chats, sticker/emoticon/emojis/picture posting, bulletin boards, voice calls/voice messages, file transfer, etc.), so that the second member is blocked from using all the executable functions except for responding to the questionnaire (executing the questionnaire response module 40).

Step S117: The selection commands are received, and selected options in the questionnaire are uploaded after the response commands are received. After the second member operates the second mobile communication device 26*b* to respond to the questionnaire, the questionnaire response module 40 receives the selection commands for selecting the options in the questionnaire (i.e., the user clicks on "check boxes" or a "radio button"), and then uploads the selected options after receiving the response commands (i.e., the user clicks on the "respond" button).

Step S118: An unlocking operation is performed. After the selected options in the questionnaire are uploaded, the function lock module 36 performs an unlocking operation. This means that the second member can now use any other executable functions in the app 28.

Step S119: Statistics are generated based on the selected options from the responded questionnaires, and a questionnaire statistics report is generated. The questionnaire collecting and statistics generating module 18 generates statistics based on all the selected options from the responded questionnaires and generates a questionnaire statistics report.

To sum up, the present invention discloses a must-reply mobile questionnaire system and method that solves problems in the prior art. The present invention has the following major features: organizations such as groups or corporations may have a flexible, multi-level structure, and questionnaires may be issued to specific levels; a single cloud system is used to provide services to many groups or corporations; a single app and a single portal (i.e., a connecting interface) are used to access the hybrid cloud system; a technique for must-reply electronic questionnaires is provided.

While the present invention has been described by way of preferred embodiments, it is to be understood that this invention is not limited hereto, and that various changes and alterations can be made herein by those skilled in the art without departing from the spirit and scope of this invention. The scope of protection of the present invention is defined by the appended claims.

What is claimed is:

1. A must-reply mobile questionnaire system, comprising:
a database storing a plurality of questionnaires, a selected option corresponding to the questionnaires, and a plurality of member information sets;

a server accessing the database and establishing an Internet connection to at least one mobile communication device having one of the member information sets, the server generating a questionnaire issuing request based on the questionnaire and a questionnaire recipient push list, the questionnaire recipient push list comprising at least one push ID corresponding to one of the member information sets; and a push gateway generating a push notification based on the questionnaire issuing request and sending the push notification to the mobile communication device via a push server, wherein the server receives, via the Internet connection, the selected option responded from the mobile communication device, the selected option is stored to the database;

wherein the database, the server, and the push gateway compose a cloud;

wherein the server further comprises a questionnaire collecting and statistics generating module, which generates statistics based on the responded selected option and then generates a questionnaire statistics report;

wherein the server further comprises a questionnaire generating module for generating the questionnaire recipient push list, the questionnaire recipient push list is generated by selecting, from an organization contact list, specific member information sets, specific levels of the organization, a specific group list, or all of the member information sets of the organization;

wherein the organization contact list or the specific group list is edited by an administrator who has permission to edit; and wherein the server comprises a plurality of modules which belong to a server module group; in a hybrid cloud model, the server module group is divided to have its modules located in a public cloud system and a private cloud system separately, while a login authentication module or the questionnaire generating module is located in the public cloud system; and when the mobile communication device executes an application to receive a command corresponding to the server module group, a redirection is performed based on a server module location information.

2. The must-reply mobile questionnaire system of claim 1, wherein the questionnaire comprises an attribute and at least two options, wherein the attribute is selected from: compulsory, non-compulsory, named, anonymous, single answer, and multiple answers.

3. The must-reply mobile questionnaire system of claim 1, wherein the mobile communication device downloads the questionnaire from the server after executing an application to receive the push notification, and if the questionnaire is a must-reply one, all executable functions on the mobile communication device are locked until the application receives a response command to unlock them.

4. The must-reply mobile questionnaire system of claim 3, wherein the application receives the response command to generate the responded selected option and uploads the responded selected option to the server via the Internet connection.

5. The must-reply mobile questionnaire system of claim 3, wherein the application comprises a questionnaire response module for receiving a selection command for the selected option and uploads the responded selected option after receiving the response command.

6. The must-reply mobile questionnaire system of claim 3, wherein the push notification comprises a push notification serial number, and the application downloads the questionnaire from the server based on the push notification serial number.

7. The must-reply mobile questionnaire system of claim 1, wherein the mobile communication device executes an application to receive a response command so as to generate the responded selected option, such that the mobile communication device can be unlocked.

8. A must-reply mobile questionnaire method applied to a cloud composed of a database, a server, and a push gateway, the must-reply mobile questionnaire method comprising:
    storing to the database a plurality of questionnaires, a selected option corresponding to the questionnaires, and a plurality of member information sets;
    establishing an Internet connection between the server and at least one mobile communication device having one of the member information sets;
    generating, by the server, a questionnaire issuing request based on the questionnaire and a questionnaire recipient push list, the questionnaire recipient push list comprising at least one push ID corresponding to one of the member information sets;
    generating, by the push gateway, a push notification based on the questionnaire issuing request, and sending, via a push server, the push notification to the mobile communication device;
    receiving, by the server via the Internet connection, the selected option responded and uploaded from the mobile communication device, and storing the responded selected option to the database; and
    generating statistics based on the responded selected option and then generating a questionnaire statistics report;
    wherein the questionnaire recipient push list is generated by selecting, from an organization contact list, specific member information sets, specific levels of the organization, a specific group list, or all of the member information sets of the organization; and
    wherein the organization contact list or the specific group list is edited by an administrator who has permission to edit; and
    wherein the server comprises a plurality of modules which belong to a server module group; in a hybrid cloud model, the server module group is divided to have its modules located in a public cloud system and a private cloud system separately, while a login authentication module or a questionnaire generating module is located in the public cloud system; and when the mobile communication device executes an application to receive a command corresponding to the server module group, a redirection is performed based on a server module location information.

9. The must-reply mobile questionnaire method of claim 8, wherein the questionnaire comprises an attribute and at least two options, wherein the attribute is selected from: compulsory, non-compulsory, named, anonymous, single answer, and multiple answers.

10. A must-reply mobile questionnaire method applied to a mobile communication device that accesses a cloud composed of a database, a server, and a push gateway, the database storing a plurality of questionnaires and member information sets, the must-reply mobile questionnaire method comprising:
    establishing an Internet connection between the server and the mobile communication device having one of the member information sets;

generating by the server, a questionnaire issuing request based on the questionnaire and a questionnaire recipient push list, the questionnaire recipient push list comprising at least one push ID corresponding to one of the member information sets;

after receiving a push notification, locking all executable functions on the mobile communication device, and unlocking all the executable functions after the mobile communication device receives a response command to generate a responded selected option;

after receiving the push notification, downloading the questionnaire from the server;

receiving the response command to generate the responded selected option, and uploading the responded selected option to the server; and generating statistics based on the responded selected option and then generating a questionnaire statistics report;

wherein the questionnaire recipient push list is generated by selecting, from an organization contact list, specific member information sets, specific levels of the organization, a specific group list, or all of the member information sets of the organization;

wherein the organization contact list or the specific group list is edited by an administrator who has permission to edit; and wherein the server comprises a plurality of modules which belong to a server module group; in a hybrid cloud model, the server module group is divided to have its modules located in a public cloud system and a private cloud system separately, while a login authentication module or a questionnaire generating module is located in the public cloud system; and when the mobile communication device executes an application to receive a command corresponding to the server module group, a redirection is performed based on a server module location information.

11. The must-reply mobile questionnaire method of claim 10, wherein the push notification comprises a push notification serial number, and the mobile communication device executes an application to download the questionnaire from the server based on the push notification serial number.

12. The must-reply mobile questionnaire method of claim 10, wherein the questionnaire comprises an attribute and at least two options, wherein the attribute is selected from: compulsory, non-compulsory, named, anonymous, single answer, and multiple answers.

* * * * *